(12) United States Patent
Mertes et al.

(10) Patent No.: US 7,223,457 B1
(45) Date of Patent: May 29, 2007

(54) COMPOSITE ELEMENTS

(75) Inventors: Jürgen Mertes, Altrip (DE); Thomas Bartz, Wiedenhausen (DE); Georg Knoblach, Munich (DE); Heike Wild, Olching (DE); Stephen Kennedy, Ottawa (CA)

(73) Assignee: BASF Aktiengesellschaft, Ludwigshafen (DE)

( * ) Notice: Subject to any disclaimer, the term of this patent is extended or adjusted under 35 U.S.C. 154(b) by 567 days.

(21) Appl. No.: 10/111,057

(22) PCT Filed: Oct. 25, 2000

(86) PCT No.: PCT/EP00/10521

§ 371 (c)(1),
(2), (4) Date: Apr. 19, 2000

(87) PCT Pub. No.: WO01/32415

PCT Pub. Date: May 10, 2001

(30) Foreign Application Priority Data

Nov. 4, 1999 (DE) .................. 199 53 240

(51) Int. Cl.
B03B 25/08 (2006.01)

(52) U.S. Cl. .............. 428/131; 428/137; 428/138; 114/355; 114/356; 114/357; 114/74 A

(58) Field of Classification Search ............ 428/131, 428/137, 138; 114/356, 355, 357, 74 A
See application file for complete search history.

(56) References Cited

U.S. PATENT DOCUMENTS

| | | |
|---|---|---|
| 3,773,007 A * | 11/1973 | Haisch .............. 114/219 |
| 4,304,080 A | 12/1981 | Freeman |
| 4,313,996 A | 2/1982 | Newman et al. |
| RE31,213 E | 4/1983 | Brachman |
| 4,673,102 A | 6/1987 | Bullock, Jr. |
| 4,678,707 A | 7/1987 | Shinozaki et al. |
| 4,680,227 A | 7/1987 | Aoyagi et al. .............. 428/331 |
| 4,681,816 A | 7/1987 | Hashimoto et al. |
| 4,709,781 A | 12/1987 | Scherzer |
| 4,739,722 A | 4/1988 | Rogstad |
| 4,756,943 A | 7/1988 | Koletzko |
| 4,758,299 A | 7/1988 | Burke |
| 4,850,297 A | 7/1989 | Rogstad |
| 4,883,717 A | 11/1989 | Kitamura et al. |
| 4,937,125 A | 6/1990 | Sanmartin et al. .......... 428/116 |
| 4,940,360 A | 7/1990 | Weholt |
| 4,942,080 A | 7/1990 | Hevel et al. |
| 4,978,582 A | 12/1990 | Stamm et al. |
| 4,992,323 A | 2/1991 | Vogelesang et al. |
| 5,007,225 A | 4/1991 | Teasdale |
| 5,030,488 A * | 7/1991 | Sobolev .................. 428/35.9 |

(Continued)

FOREIGN PATENT DOCUMENTS

DE 198 25 083 A1 * 9/1999

(Continued)

OTHER PUBLICATIONS

PCT International Search Report Dated Jan. 19, 2001.

Primary Examiner—Alicia Chevalier
(74) Attorney, Agent, or Firm—Fernando A. Borrego

(57) ABSTRACT

The invention relates to composite elements comprising the following layered structure: (i) 2 to 20 mm metal, (ii) 10 to 300 mm plastic, (iii) 2 to 20 mm metal, whereby (i) and/or (iii) optionally comprise a closable opening.

27 Claims, 4 Drawing Sheets

U.S. PATENT DOCUMENTS

| | | | |
|---|---|---|---|
| 5,052,732 A * | 10/1991 | Oplet et al. ............... 293/102 |
| 5,093,204 A | 3/1992 | Watanabe et al. |
| 5,106,668 A | 4/1992 | Turner et al. |
| 5,116,688 A | 5/1992 | Minamida et al. |
| 5,143,790 A | 9/1992 | Sattinger |
| 5,184,439 A | 2/1993 | Ward |
| 5,198,975 A | 3/1993 | Baker et al. |
| 5,218,919 A | 6/1993 | Krulikowski, III et al. |
| 5,353,502 A | 10/1994 | Hattori et al. |
| 5,359,953 A | 11/1994 | Skaarup et al. |
| 5,398,630 A | 3/1995 | Skaarup et al. |
| 5,424,113 A | 6/1995 | Ray et al. |
| 5,437,903 A | 8/1995 | Christensen |
| 5,477,797 A | 12/1995 | Stuart |
| 5,478,654 A | 12/1995 | Hargis et al. ............... 429/457 |
| 5,542,365 A | 8/1996 | Jurisich et al. |
| 5,647,933 A | 7/1997 | Christensen |
| 5,741,571 A | 4/1998 | Bowerman et al. |
| 5,773,783 A | 6/1998 | Bowerman et al. |
| 5,794,402 A | 8/1998 | Dumlao et al. |
| 5,797,235 A | 8/1998 | Bowerman et al. |
| 5,803,004 A | 9/1998 | Swann et al. |
| 5,834,082 A | 11/1998 | Day |
| 5,862,772 A | 1/1999 | Yancey et al. |
| 5,899,162 A | 5/1999 | Beaupre et al. |
| 6,009,821 A | 1/2000 | Al-Rammah |
| 6,044,607 A | 4/2000 | Dumlao et al. |
| 6,050,208 A * | 4/2000 | Kennedy ............... 114/74 A |
| 6,057,025 A * | 5/2000 | Kalman ............... 428/116 |
| 6,070,378 A | 6/2000 | Dumlao et al. |
| 6,081,955 A | 7/2000 | Dumlao et al. |
| 6,092,350 A | 7/2000 | Dumlao et al. |
| 6,108,998 A | 8/2000 | Dumlao |
| 6,170,422 B1 | 1/2001 | Macander et al. |
| 6,182,409 B1 | 2/2001 | Visser |

FOREIGN PATENT DOCUMENTS

| | | |
|---|---|---|
| EP | B 022 665 | 1/1981 |
| EP | A 058 970 | 9/1982 |
| EP | A 108 710 | 5/1984 |
| EP | B 248 547 | 12/1987 |
| EP | B 297 801 | 1/1989 |
| EP | 0352608 | 1/1990 |
| EP | A 512 183 | 11/1992 |
| EP | B 219 104 | 11/1992 |
| EP | B 521 793 | 1/1993 |
| EP | B 559 568 | 9/1993 |
| EP | A 693 598 | 11/1996 |
| EP | B 754 815 | 1/1997 |
| EP | 1049181 | 11/2000 |
| EP | A 1072505 | 1/2001 |
| WO | WO-A 90/01598 | 2/1990 |
| WO | WO-A 91/19866 | 12/1991 |
| WO | WO-A 92/12006 | 7/1992 |
| WO | WO-A 94/26585 | 11/1994 |
| WO | WO99/36975 | 7/1999 |
| WO | WO99/64233 | 12/1999 |
| WO | WO-A 99/64234 | 12/1999 |
| WO | WO-A 00/13890 | 3/2000 |
| WO | WO-A 00/30930 | 6/2000 |
| WO | WO-A 00/35746 | 6/2000 |
| WO | WO-A 00/59718 | 10/2000 |
| WO | WO-A 01/12499 | 2/2001 |

* cited by examiner

COMPOSITE ELEMENTS

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The invention relates to composite elements which have the following layer structure:
(i) from 2 to 20 mm of metal,
(ii) from 10 to 300 mm of plastic, preferably compact plastics, preferably polyisocyanate polyaddition products, particularly preferably polyurethanes, and
(iii) from 2 to 20 mm of metal, where (i) and/or (iii) have an opening which may, if desired, be sealable. For the purposes of the present invention, the term "opening" implies that (i) and/or (iii) do not seal off (ii) from the surroundings of that side of (i) and/or (iii) which faces away from (ii).

The invention further relates to the use of open or closed valves in composite elements of this type, and also to the use of the composite elements.

The structural components used in the design of ships, for example hulls and cargo hold covers, or of bridges or multistory buildings, have to be able to withstand considerable stresses from external forces. Due to these requirements structural components of this type are usually composed of metal plates or metal supports, strengthened by appropriate geometry or suitable struts. Due to increased safety standards, tanker hulls therefore are usually composed of an inner and an outer hull, each hull being built up from steel plates of 15 mm thickness, connected to one another via steel struts about 2 m in length. Since these steel plates are exposed to considerable forces, both the outer and the inner steel shells are reinforced by welded-on reinforcing elements. Disadvantages of these traditional structural components are both the considerable amounts of steel required and the time-consuming and labor-intensive method of manufacture. In addition, structural components of this type have considerable weight, reducing the tonnage of the ships and increasing fuel usage. Traditional structural components of this type based on steel also require heavy maintenance, since both the outer surface and the surfaces of the steel components between the outer and the inner shells regularly have to be protected against corrosion.

It is an object of the present invention, therefore, to develop structural components which withstand large loads exerted by external forces and can be used in the construction of ships, of bridges or of multistorey buildings, for example. The structural components to be developed, also called composite elements, are intended to serve as a replacement for known designs based on steel, and in particular to have advantages interms of their weight, production process and maintenance requirement. The composite elements are in particular intended to have controllable behaviour which is retained at high temperatures.

BRIEF SUMMARY OF THE INVENTION

Composite elements which are composed of a metal/plastic/metal composite may be used as an alternative to the designs in steel described in the introduction. In the case of these composite elements it would be conceivable that if the temperature between the metal layers were extremely high, an increased pressure could be built up between these layers. This excess pressure could lead to cracking of the metal layers, and this would be attended by a loss of loadbearing capability of the entire composite element, and any sudden release of pressure would create a particular risk. A particular object was therefore to prevent the occurrence of any possible risks which would attend a build-up of pressure in a metal/plastic/metal composite.

We have found that this object is achieved by the composite elements described at the outset.

At extremely high temperatures it is possible in some cases for there to be decomposition of the plastic between the metal layers, followed by evaporation creating pressure between the metal layers. This is particularly the case if the plastic layer (ii) has been completely surrounded by (i) and (iii). According to the invention any excess pressure of this type between the metal layers (i) and (iii) is released via at least one opening in (i) and/or (iii). This opening may be present in a sealed or open or sealable form, and it is preferable for the closed opening to open automatically as a result of an external effect, such as a temperature and/or pressure rise. The opening may have been filled with a material, for example, or provided with a seal in the form of a cap, so that if there is excess pressure in (ii) and/or there is a temperature rise, the opening opens. Examples of materials which reversibly seal the opening are metals with a melting point below 450° C., e.g. lead and/or tin, preferably lead, or else organic compounds or plastics, preferably with a melting point below 250° C. An advantage of sealing the opening with the materials mentioned, hereinafter also termed filling materials, for example by filling or covering the opening, is that although (ii) is protected from the environment outside the composite element, for example water, air or chemicals, any build-up of pressure in (ii), in particular as a result of a temperature rise, is rapidly released. The filling material may be introduced into the opening in solid, softened or molten form, for example simply by being placed there or by being inserted manually or mechanically, for example using a hammer.

The opening may be composed of a hole in (i) and/or (iii). It is also possible to incorporate the opening into (i) and/or (iii) by way of an element, indicated in the drawings as (ix), for example one made from the material used for (i) and/or (iii), and having the opening. This incorporation of the element, for example of the valve, which may, if desired, have been closed, for example by the filler, may take place prior to, during or after the production of (ii) between (i) and (iii). The element may be secured by screwing or bolting, welding and/or adhesive bonding, for example to the as yet incompletely reacted reaction system for producing (ii). Appropriate openings and elements are shown in FIGS. 3, 4, 5 and 6, in which for simplicity the second metal layer has not been depicted.

It is preferable for the elements to have flush joints with the surface of (i) and/or (iii) on the surface facing away from (ii), i.e. the surface of (i) and/or (iii) is level with the element incorporated, and the element does not project therefrom.

The opening preferably has a diameter of from 0.5 to 100 mm, particularly preferably from 1 to 10 mm, very particularly preferably from 2 to 8 mm.

Preference is therefore given to composite elements whose opening according to the invention has been closed and opens when the pressure difference between (ii) and the other, outward-facing, side of (i) and/or (iii), i.e. the region outside the composite element, is at least 10 bar, where the higher pressure is present in (ii), and/or opens when the temperature is above 250° C., preferably above 450° C.

The opening is preferably a valve which has particularly preferably been connected to (i) and/or (iii) by a method using screw threads. A screwed-on element of this type, shown by way of example in FIGS. 4 and 5, preferably has a diameter of from 5 to 150 mm, particularly preferably from 15 to 100 mm.

DETAILED DESCRIPTION OF THE INVENTION

The figures given in the figures are dimensions in mm.

Figure 1:
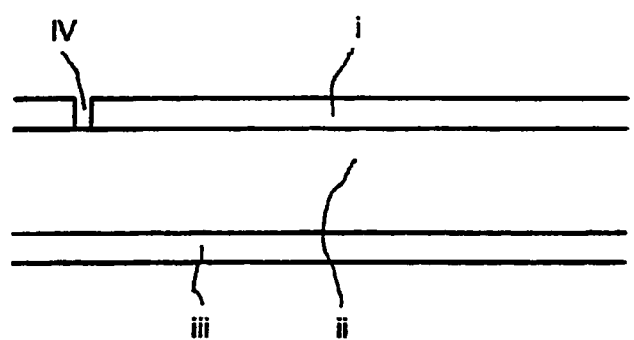
FIG. 1 gives a diagram of the novel composite elements. (i) and (iii) in the figure are the appropriate metal layers and (ii) is the plastic, which preferably adheres both to (i) and to (iii).
Figure 2:
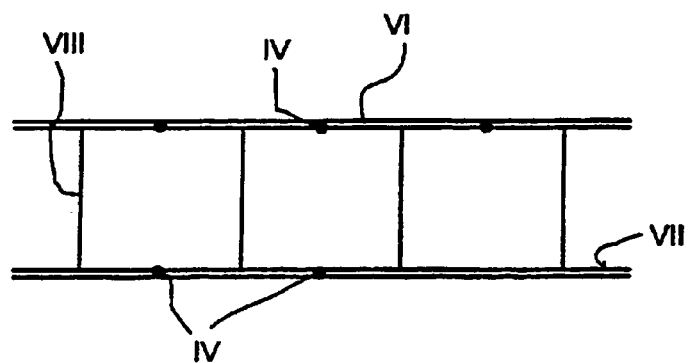
FIG. 2 shows composite elements of the present invention arranged in the form of a double-walled element of a ship. The opening is indicated by (iv).
Figure 3:
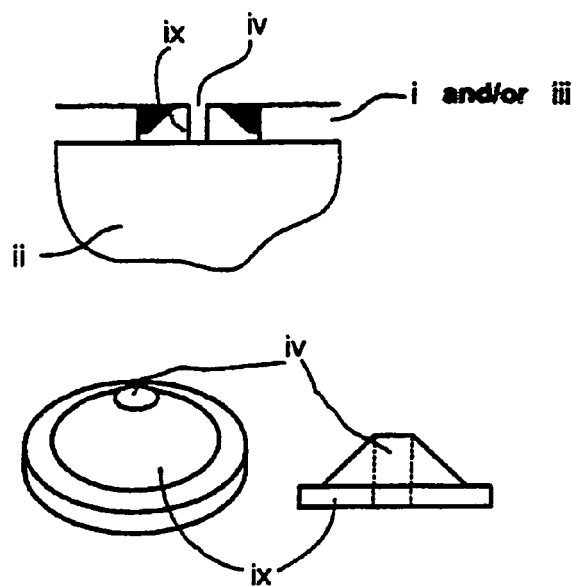
FIGS. 3, 4, 5 and 6 are diagrams of embodiments of the opening, for example in the form of elements which have an opening and have been incorporated by a method using screw threads.
Figure 4:
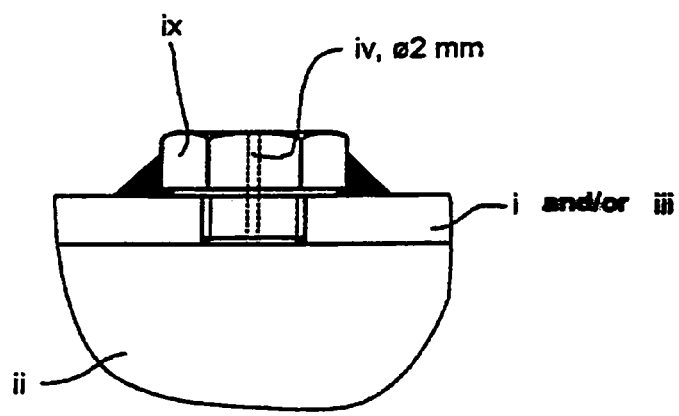
Figure 5:
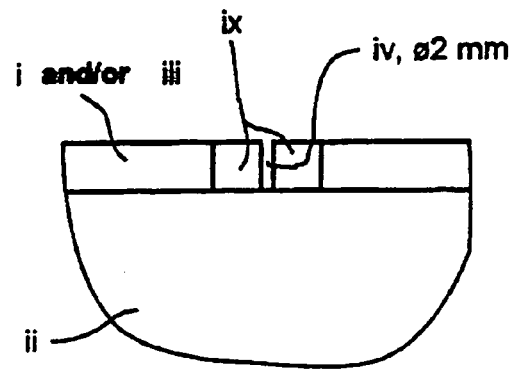
Figure 5:
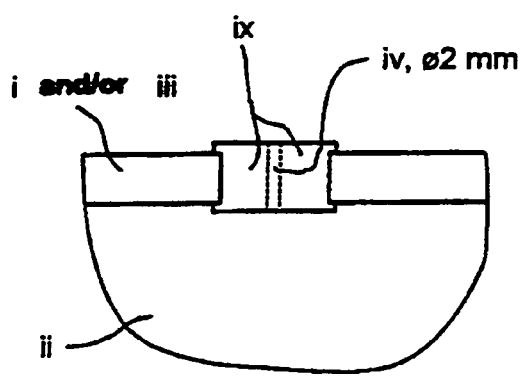
Figure 6:
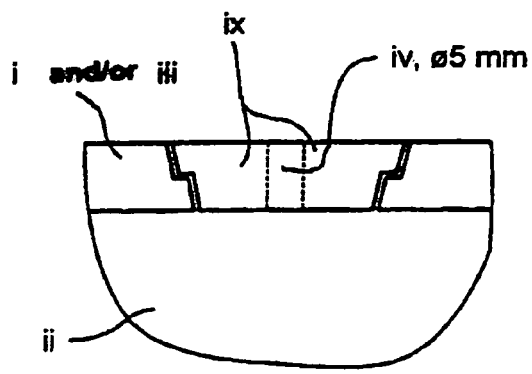

The composite elements may have been arranged in the form of a double-walled element of a ship, as shown in FIG. 2. The opening is indicated by (iv). The two composite elements have been indicated by (vi) and (vii). The composite elements have been connected by cross struts indicated by (viii).

Figure 7:
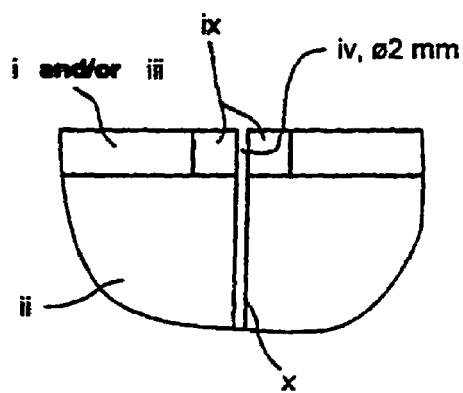
FIGS. 7 and 8 show a composite element including an opening in one of (i) and (iii) that is connected to one end of a pipe (x) which extends into (ii).
Figure 8:
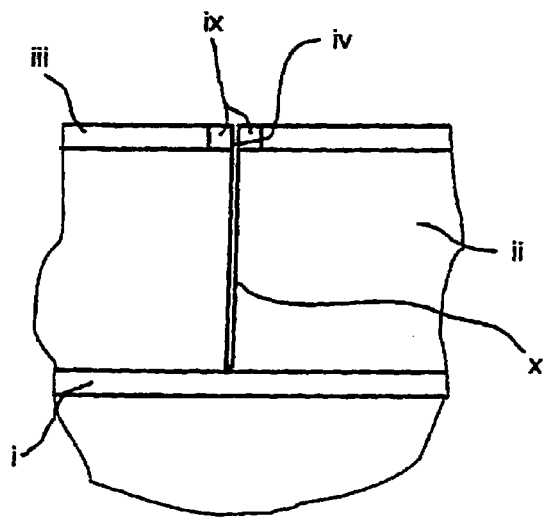

The opening may preferably have been connected to one end of a pipe (x) which extends into (ii) and whose other end is at a distance of from 0.5 to 9.5 mm from the surface in contact with (ii) of the metal layer which does not have the opening connected to the pipe. An arrangement of this type is shown in FIGS. 7 and 8. The figure shows the pipe, the open interior of which has been connected to the opening. The other end of the pipe extends as far as the appropriate distance from the surface of the other metal layer. This has the advantage that gas which is formed on one side of the composite element, for example by intense heating as a result of a fire, is removed at that side of the composite element which faces away from the fire. This prevents the fire from igniting the gas.

Preference is therefore given to the use of open or closed valves in composite elements which have the following layer structure:

(i) from 2 to 20 mm of metal,
(ii) from 10 to 300 mm of plastic, and
(iii) from 2 to 20 mm of metal, for reducing a pressure difference between (ii) and the other outward-facing side of (i) and/or (iii), where the higher pressure is present in (ii), and the use of open or closed valves in composite elements which have the following layer structure:

(i) from 2 to 20 mm of metal,
(ii) from 10 to 300 mm of plastic, and
(iii) from 2 to 20 mm of metal,
for dissipating gases from (ii).

The opening in the figures may, as described above, have been sealed. Even if this is not indicated in detail in the drawings, therefore, a filling material may be present in each opening, or the opening may have been sealed by a cap, as described at the outset.

In addition to the abovementioned advantages, the novel composite elements have excellent mechanical properties.

The novel composite elements may be manufactured by producing, between (i) and (iii), for example, polyisocyanate polyaddition products (ii), usually polyurethanes, which may, if desired, have urea structures and/or isocyanurate structures, by way of reacting (a) isocyanates with (b) compounds reactive toward isocyanates, preferably in the presence of from 1 to 50% by volume, based on the volume of the polyisocyanate polyaddition products, of at least one gas (c), and also, if desired, of (d) catalysts and/or (e) auxiliaries and/or additives, where these preferably adhere to (i) and (iii).

Despite the preferred use of (c) the polyisocyanate polyaddition products may be termed compact products, since no network of gas-filled cells is formed.

The reaction is preferably carried out in a closed mold, for example using (i) and (iii) as outer layers, so that when the mold is filled (i) and (iii) are in the mold together with the starting components for producing (ii), and the mold is sealed when all of the starting components have been introduced. Once the starting components have been reacted to produce (ii) the composite element may be demolded. The usual methods and materials may be used for the preferred lateral sealing-off of the space between (i) and (iii).

It is preferable to sand-blast those surfaces of (i) and/or (iii) to which (ii) adheres once the composite elements have been produced. Usual processes may be used for this sand-blasting. For example, the usual sand may be used to sand-blast the surfaces at high pressure, thus, for example, cleaning and roughening the surfaces. Suitable equipment for a treatment of this type is commercially available.

This treatment of those surfaces of (i) and (iii) which are in contact with (ii) once (a) has been reacted with (b) in the presence of (c) and also, if desired, (d) and/or (e) can give markedly improved adhesion of (ii) to (i) and (iii). The sand-blasting is preferably carried out directly prior to the introduction of the components used for producing (ii) into the space between (i) and (iii).

To produce the composite elements, for example after the preferred treatment of the surfaces of (i) and (iii), these layers are preferably fixed in a suitable arrangement, for example parallel to one another. The distance selected is usually such that the space between (i) and (iii) has a thickness of from 10 to 300 mm. (i) and (iii) may be fixed by way of spacers, for example. It is preferable for the edges of the intervening space to be sealed off in a way which allows the space between (i) and (iii) to be charged with (a), (b) and (c), and also, if desired, (d) and/or (e), but prevents these components from escaping. For the sealing-off use may be made of the usual plastics films or metal films and/or metal plates, and these may also serve as spacers.

The layers (i) and (iii) used may preferably be the usual metal plates, such as steel plates, with the thicknesses according to the invention.

When the space between (i) and (iii) is filled, (i) and (iii) may be vertical or horizontal.

The usual conveying equipment, such as high- or low-pressure machinery, preferably high-pressure machinery, may be used to charge the space between (i) and (iii), preferably continuously, with (a), (b) and preferably (c) and, if used, (d) and/or (e).

The conveying rate may be varied as a function of the volume to be filled. In order to ensure uniform through-curing of (ii), the conveying rate and conveying equipment selected is such that the space to be filled can be filled within a period of from 0.5 to 20 min, preferably from 1.5 to 7 min, with the components for producing (ii).

The layers (i) and (iii) used are usually plates and may be the usual metals, such as iron, conventional steel, any type of refined steel, aluminum and/or copper.

When producing the novel composite elements, either (i) or else (ii) may be used in coated form, for example primed, otherwise surface-coated and/or coated with conventional plastics. (i) and (iii) are preferably used uncoated, and particularly preferably, for example, after cleaning by conventional sand-blasting.

The preparation of the polyisocyanate polyaddition products (ii), usually polyurethane products and, if desired, polyisocyanurate products, in particular polyurethane elastomers, by reacting (a) isocyanates with (b) compounds reactive toward isocyanates, preferably in the presence of (c) and also, if desired, of (d) catalysts and/or (e) auxiliaries and/or additives has been described many times. It is preferable to avoid adding blowing agents to the starting components for producing (ii). In order that any uncontrolled foaming process is very substantially avoided, the starting components (b) and (c) and also, if used, (d) and/or (e) should preferably be dry, as should those surfaces of (i) and (iii) which come into contact with the reaction components.

The locations of the openings according to the invention may, for example, be at points in (i) and (iii) via which the space between (i) and (iii) was filled to produce (ii). For example, appropriate drilled holes in (i) and/or (iii) may be used for this purpose.

The water content of the reaction mixture comprising (a), (b), (c) and, if desired, (d) and/or (e) is preferably from 0 to 0.03% by weight, particularly preferably 0% by weight, based on the weight of the reaction mixture. The appropriate water content, in particular in component (b), may be established by distillation, for example. It is also possible for compounds to be added to the reaction mixture which bind water and thus prevent any blowing reaction. Compounds of this type, such as molecular sieves, are well known. Silicates and oxazolidines are examples of compounds which may be used in a suitable, preferably finely divided form. The amounts of the these compounds preferably added to component (b) are from 0.05 to 5% by weight, particularly preferably from 2 to 4.5% by weight, based on the weight of the reaction mixture.

Examples of the starting materials (a), (b), (c), (d) and (e) for the novel process are given below:

Possible isocyanates (a) are the aliphatic, cycloaliphatic, araliphatic and/or aromatic isocyanates known per se, preferably diisocyanates, which may have been biuretized and/or isocyanuratized by well-known processes. Individual examples are: alkylene diisocyanates having from 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate, lysin ester diisocyanate (LDI), hexamethylene 1,6-diisocyanate (HDI), cyclohexane 1,3- and/or 1,4-diisocyanate, hexahydrotolylene 2,4- and 2,6-diisocyanate, and also the corresponding isomer mixtures, dicyclohexylmethane 4,4'-, 2,2'- and 2,4'-diisocyanate, and also the corresponding isomer mixtures, 1-isocyanato-3,3,5-trimethyl-5-isocyanatomethylcyclohexane (IPDI), tolylene 2,4- and/or 2,6-diisocyanate (TDI), diphenylmethane 4,4'-, 2,4'- and/or 2,2'-diisocyanate (MDI), polyphenylpolymethylene polyisocyanate and/or mixtures comprising at least two of the isocyanates mentioned. Use may also be made in the novel process of di- and/or polyisocyanates containing ester groups, urea groups, allophanate groups, carbodiimide groups, uretdione groups and/or urethane groups. Use is preferably made of 2,4'-, 2,2'- and/or 4,4'-MDI and/or of polyphenylpolymethylene polyisocyanates, particularly preferably of mixtures comprising polyphenylpolymethylene polyisocyanates and at least one of the MDI isomers.

Examples of compounds (b) which may be used and are reactive toward isocyanates are those in which the group(s) reactive toward isocyanates is/are hydroxyl, thiol and/or primary and/or secondary amino, for example polyols selected from the group consisting of polyether polyalcohols, polyester polyalcohols, polythioether polyols, hydroxy-containing polyacetals and hydroxyl-containing aliphatic polycarbonates, and mixtures made from at least two of the polyols mentioned. These compounds usually have a functionality of from 1 to 8, preferably from 1.5 to 6, particularly preferably from 2 to 6, and preferably have a molecular weight of from 400 to 8000. They are known to the skilled worker.

Examples of polyether polyalcohols are those which are obtainable using known technology by adding alkylene oxides, such as tetrahydrofuran, propylene 1,3-oxide, butylene 1,2- or 2,3-oxide, styrene oxide and preferably ethylene oxide and/or propylene 1,2-oxide, to conventional starter substances. Examples of starter substances which may be used are known aliphatic, araliphatic, cycloaliphatic and/or aromatic compounds containing at least one, preferably 2 to 4, hydroxyl group(s) and/or at least one, preferably 2 to 4, amino group(s). Examples of compounds which may be used as starter substances are ethanediol, diethylene glycol, 1,2- and 1,3-propanediol, 1,4-butanediol, 1,5-pentanediol, 1,6-hexanediol, 1,7-heptanediol, glycerol, trimethylolpropane, neopentyl glycol, sugars, such as sucrose, pentaerythritol, sorbitol, ethylenediamine, propanediamine, neopentanediamine, hexamethylenediamine, isophoronediamine, 4,4'-diaminodicyclohexylmethane, 2-(ethylamino)ethylamine, 3-(methylamino)propylamine, diethylenetriamine, dipropylenetriamine and/or N,N'-bis(3-aminopropyl)ethylenediamine.

The alkylene oxides may be used individually or alternating in succession, or as mixtures. Preference is given to the use of alkylene oxides which give primary hydroxyl groups in the polyol. Particular preference is given to the use of polyols which have been alkoxylated with ethylene oxide at the end of the alkoxylation and therefore have primary hydroxyl groups.

Suitable polyester polyols may be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. The polyester polyols preferably have a functionality of from 2 to 4, in particular from 2 to 3, and a molecular weight of from 480 to 3000, preferably from 600 to 2000, in particular from 600 to 1500.

The novel composite elements are preferably produced using polyether polyalcohols as components (b) for the reaction with the isocyanates, advantageously those with an average functionality of from 1 to 8, preferably from 1.5 to 6 and with a molecular weight of from 400 to 8000.

The use of polyether polyalcohols offers considerable advantages by way of improved resistance of the polyisocyanate polyaddition products to hydrolytic cleavage, and due to their lower viscosity, in each case compared with polyester polyalcohols. The improved resistance to hydrolysis is particularly advantageous for use in ship building. The lower viscosity of the polyether polyalcohols and of the reaction mixture for producing (ii) comprising the polyether polyalcohols permits simpler and more rapid filling of the space between (i) and (iii) with the reaction mixture for producing the composite elements. Low-viscosity liquids give a considerable advantage in shipbuilding since the dimensions, in particular of structural components, are substantial.

Other suitable compounds reactive toward isocyanates are substances which have a hydrocarbon skeleton having from 10 to 40 carbon atoms and from 2 to 4 groups reactive toward isocyanates. For the purposes of the invention, a hydrocarbon skeleton is a succession of carbon atoms which is uninterrupted and not, as is the case for example with ethers, interrupted by oxygen atoms. Substances of this type which can be used, also referred to below as (b3), are castor oil and derivatives thereof, for example.

Other compounds which are reactive toward isocyanates and which, in addition to the abovementioned compounds with a usual molecular weight of from 400 to 8000, may be used if desired as chain extenders and/or crosslinking agents in the novel process are diols and/or triols with molecular weights of from 60 to <400. It may moreover prove advantageous for modifying mechanical properties, such as hardness, to add chain extenders, crosslinking agents or, if desired, mixtures of these. The chain extenders and/or crosslinking agents preferably have a molecular weight of from 60 to 300. Examples of possible compounds are aliphatic, cycloaliphatic and/or araliphatic diols having from 2 to 14 carbon atoms, preferably from 4 to 10 carbon atoms, for example ethylene glycol, 1,3-propanediol, 1,10-decanediol, o-, m- or p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, glycerol and trimethylolpropane, low-molecular-weight polyalkylene oxides containing hydroxyl groups and based on ethylene oxide and/or on propylene 1,2-oxide and on the abovementioned diols and/or triols as starter molecules and/or diamines such as, for example, diethyltoluenediamine and/or 3,5-dimethylthio-2,4-toluenediamine.

If chain extenders, crosslinking agents or mixtures thereof are used for preparing the polyisocyanate polyaddition products, these are usefully used in amounts of from 0 to 30% by weight, preferably from 1 to 30% by weight, based on the weight of all of the compounds (b) used which are reactive toward isocyanates.

Other compounds which may be used as (b) in order to optimize the progress of curing during the production of (ii) are aliphatic, araliphatic, cycloaliphatic and/or aromatic carboxylic acids. Examples of carboxylic acids of this type are formic acid, acetic acid, succinic acid, oxalic acid, malonic acid, glutaric acid, adipic acid, citric acid, benzoic acid, salicylic acid, phenylacetic acid, phthalic acid, toluenesulfonic acid, and derivatives of the acids mentioned, isomers of the acids mentioned and any desired mixture of the acids mentioned. The proportion of these acids by weight may be from 0 to 5% by weight, preferably from 0.2 to 2% by weight, based on the total weight of (b).

(b) is preferably a mixture which comprises:
 (b1) from 40 to 99% by weight of polyether polyalcohol with an average functionality of from 1.5 to 2.99 and with an average molecular weight of from 400 to 8000, and
 (b2) from 1 to 60% by weight of polyether polyalcohol with an average functionality of from 3 to 5 and with an average molecular weight of from 150 to 8000, where all of the weight data are based on the total weight of the mixture.

(b) is particularly preferably a mixture which comprises:
 (b1) from 40 to 98% by weight, preferably from 50 to 80% by weight, of polyether polyalcohol with an average functionality of from 1.9 to 3.2, preferably from 2.5 to 3, and with an average molecular weight of from 2500 to 8000,
 (b2) from 1 to 30% by weight, preferably from 10 to 25% by weight, of polyether polyalcohol with an average functionality of from 1.9 to 3.2, preferably from 2.5 to 3 and with an average molecular weight of from 150 to 399, and
 (b3) from 1 to 30% by weight, preferably from 10 to 25% by weight, of at least one aliphatic, cycloaliphatic and/or araliphatic diol having from 2 to 14 carbon atoms, preferably from 4 to 10 carbon atoms, where all of the weight data are based on the total weight of the mixture.

The weight ratio between polyether polyalcohols and polyester polyalcohols in component (b) is preferably >100, particularly preferably >1000, and in particular no polyester polyalcohols are used as (b) for producing (ii).

The use of amine-started polyether polyalcohols can also improve the through-curing performance of the reaction mixture for producing (ii). The compounds (b), like the other components for producing (ii), are preferably used with a very low water content, to avoid forming carbon dioxide by a reaction of the water with isocyanate groups.

Components (c) used for producing (ii) may be well known compounds, preferably gaseous at 25° C. and a pressure of 1 bar, such as air, carbon dioxide, nitrogen, helium and/or neon. It is preferable to use air. Component (c) is preferably inert toward component (a), particularly preferably toward components (a) and (b), i.e. there is hardly any, and preferably no, detectable reactivity of the gas toward (a) or (b). The use of the gas (c) differs fundamentally from the use of conventional blowing agents for producing foamed polyurethanes. Whereas conventional blowing agents are used in liquid form and during the reaction either evaporate due to heat generation or else in the case of water evolve gaseous carbon dioxide due to reaction with the isocyanate groups, component (c) in the present invention is preferably gaseous before it is used.

Shrinkage of (ii) and any resultant partial separation from (i) and/or (iii) is substantially avoided by reacting (a) with (b) in the presence of (c). Shrinkage of the plastic (ii), for example of the polyisocyanate polyaddition products, can cause some extent of separation of the plastic (ii) from the metal plates (i) and/or (iii). However, very full and complete adhesion of the plastic (ii) to the metal plates (i) and/or (iii) is specifically of particular interest for the mechanical properties of a composite element of this type.

The catalysts (d) which may be used include well-known compounds which markedly accelerate the reaction of isocyanates with the compounds reactive toward isocyanates. The total catalyst content used is preferably from 0.001 to 15% by weight, in particular from 0.05 to 6% by weight, based on the weight of all of the isocyanate-reactive compounds used. Examples of compounds which may be used are: triethylamine, tributylamine, dimethylbenzylamine, dicyclohexylmethylamine, dimethylcyclohexylamine, N,N, N',N'-tetramethyldiaminodiethyl ether, bis(dimethylaminopropyl)urea, N-methyl- and/or N-ethylmorpholine, N-cyclohexylmorpholine, N,N,N',N'-tetramethylethylenediamine, N,N,N',N'-tetramethylbutanediamine, N,N,N',N'-tetramethyl-1,6-hexanediamine, pentamethyldiethylenetriamine, dimethylpiperazine, N-dimethylaminoethylpiperidine, 1,2-dimethylimidazole, 1-azabicyclo[2.2.0]octane, 1,4-diazabicyclo[2.2.2]octane (Dabco) and alkanolamine compounds, such as triethanolamine, triisopropanolamine, N-methyl- and N-ethyldiethanolamine, dimethylaminoethanol, 2-(N,N-dimethylaminoethoxy) ethanol, N,N',N"-tris(dialkylaminoalkyl)hexahydrotriazines, e.g. N,N',N"-tris(dimethylaminopropyl)-s-hexahydrotriazine, iron(II) chloride, zinc chloride, lead octoate, and preferably tin salts, such as tin dioctoate, diethyltin hexoate, dibutyltin dilaurate and/or dibutyldilauryltin mercaptide, 2,3-dimethyl-3,4,5,6-tetrahydropyrimidine, tetraalkylammonium hydroxides, such as tetramethylammonium hydroxide, alkali metal hydroxides, such as sodium hydroxide, alkali metal alcoholates, such as sodium methylate and potassium isopropylate, and/or alkali metal salts of long-chain fatty acids having from 10 to 20 carbon atoms and, if desired, laterally positioned OH groups.

It has proven very advantageous to carry out the production of (ii) in the presence of (d) in order to accelerate the reaction.

If desired, additives and/or auxiliaries (e) may be incorporated into the reaction mixture for preparing the polyisocyanate polyaddition products (ii). Examples which may be mentioned are surface-active substances, fillers, dyes, pigments, flame retardants, agents to protect against hydrolysis, and substances with fungistatic or bacteriostatic action, and the abovementioned molecular sieves, and foam stabilizers.

Examples of possible surface-active substances are those compounds which serve to promote the homogenization of the starting materials and where appropriate, are also suitable for regulating the cell structure of the plastics. Examples which may be mentioned are emulsifiers, such as the sodium salts of castor oil sulfates or of fatty acids, and also salts of fatty acids with amines, e.g. diethylammonium oleate, diethanolammonium stearate, diethanolammonium ricinoleate, and salts of sulfonic acids, e.g. the alkali metal or ammonium salts of dodecylbenzene- or dinaphthylmethanedisulfonic acid and ricinoleic acid. The surface-active substances are usually used in amounts of from 0.01 to 5% by weight, based on 100% by weight of the total of compounds (b) used which are reactive toward isocyanates.

Examples of suitable flame retardants are tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl) ethylenediphosphate, dimethyl methanephosphonate, diethyl diethanolaminomethylphosphonate and also commercially available halogen-containing flame-retardant polyols. The compounds which may be used to provide flame retardancy to the polyisocyanate polyaddition products are, besides the abovementioned halogen-substituted phosphates, inorganic or organic flame retardants such as red phosphorus, alumina hydrate, antimony trioxide, arsenic oxide, ammonium polyphosphate and calcium sulfate, expandable graphite or cyanuric acid derivatives, e.g. melamine, or mixtures of at least two flame retardants, e.g. ammonium polyphosphates and melamine, and also, if desired, maize starch or ammonium polyphosphate, or melamine and expandable graphite and/or, if desired, aromatic polyesters. It has generally proven useful to use from 5 to 50% by weight, preferably from 5 to 25% by weight, of the flame retardants mentioned, based on the weight of all of the isocyanate-reactive compounds used.

For the purposes of the invention, fillers, in particular reinforcing fillers, are reinforcing agents, weighting agents, agents to improve abrasion performance in paints, coating agents, etc., and the usual organic and inorganic fillers known per se. Individual examples which may be mentioned are: inorganic fillers, such as silicate minerals, for example phyllosilicates, such as antigorite, serpentine, hornblends, amphiboles, chrysotile and talc, metal oxides, such as kaolin, aluminas, titanium oxides and iron oxides, metal salts, such as chalk, barite and inorganic pigments, such as cadmium sulfide and zinc sulfide, and also glass. Preference is given to the use of kaolin (china clay), aluminum silicate and coprecipitates of barium sulfate and aluminum silicate, and also to natural and synthetic fiber-forming minerals, such as wollastonite and short metal and glass fibers. Examples of possible organic fillers are: carbon, melamine, colophony, cyclopentadienyl resins and graft polymers, and also cellulose fibers, polyamide fibers, polyacrylonitrile fibers, polyurethane fibers, and polyester fibers based on aromatic and/or on aliphatic dicarboxylic esters, and in particular carbon fibers. The inorganic and organic fillers may be used individually or as mixtures.

The auxiliaries (e) and/or additives used in producing (ii) preferably comprise from 10 to 70% by weight of fillers, based on the weight of (ii). The fillers used preferably comprise talc, kaolin, calcium carbonate, barite, glass fibers and/or glass microbeads. The size selected for the particles in the fillers is preferably such as not to impede introduction into the space between (i) and (iii) of the components for producing (ii). The fillers particularly preferably have particle sizes of <0.5 mm.

It is preferable for the fillers to be used in a mixture with the polyol component in the reaction to prepare the polyisocyanate polyaddition products.

The fillers may serve to reduce the coefficient of thermal expansion of the polyisocyanate polyaddition products, which is greater than that of steel, for example, and thus to match this coefficient to that of the steel. This is particularly advantageous for a durably strong bond between layers (i), (ii) and (iii), since it results in lower stresses between the layers when they are subjected to thermal load.

The weight of (ii) by definition corresponds to the weight of the components (a), (b) and (c) and, if desired, (d) and/or (e) used to produce (ii).

It is preferable for conventional commercially available foam stabilizers well known to the skilled worker to be used as (e) for producing (ii), for example well known polysiloxane-polyoxyalkylene block copolymers, e.g. Tegostab 2219 from Goldschmidt. When producing (ii), the proportion of these foam stabilizers is preferably from 0.001 to 10% by weight, particularly preferably from 0.01 to 10% by weight, and in particular from 0.01 to 2% by weight, based on the weight of the components (b), (e) and, if used, (d) used to produce (ii). The use of these foam stabilizers stabilizes the preferred component (c) in the reaction mixture for producing (ii).

For the reaction with (a), i.e. for producing (ii), it is particularly preferable to use a mixture which comprises:
 (b1) from 40 to 98% by weight, preferably from 50 to 80% by weight, of polyether polyalcohol with an average functionality of from 1.9 to 3.2, preferably from 2.5 to 3, and with an average molecular weight of from 2500 to 8000,
 (b2) from 1 to 30% by weight, preferably from 10 to 25% by weight, of polyether polyalcohol with an average functionality of from 1.9 to 3.2, preferably from 2.5 to 3 and with an average molecular weight of from 150 to 399, and (b3) from 1 to 30% by weight, preferably from 10 to 25% by weight, of at least one aliphatic, cycloaliphatic and/or araliphatic diol having from 2 to 14 carbon atoms, preferably from 4 to 10 carbon atoms, where all of the weight data for (b1), (b2) and (b3) are based on the total weight of components (b1), (b2) and (b3), (e1) from 0.001 to 10% by weight, based on the total weight of the mixture, of foam stabilizers, and also (e2) from 0.05 to 5 [lacuna], based on the total weight of the mixture, of molecular sieves.

To prepare the polyisocyanate polyaddition products according to the invention, the amounts reacted of the isocyanates and of the compounds reactive toward isocyanates are preferably such that the ratio of equivalents of NCO groups in the isocyanates to the total of the reactive hydrogen atoms in the compounds reactive toward isocyanates is from 0.85 to 1.25:1, preferably from 0.95 to 1.15:1 and in particular from 1 to 1.05:1. If (ii) contains at least some isocyanurate groups, the ratio used between NCO groups and the total of the reactive hydrogen atoms is usually from 1.5 to 60:1, preferably from 1.5 to 8:1.

The polyisocyanate polyaddition products are usually prepared by the one-shot process or by the prepolymer process, for example with the aid of high-pressure or low-pressure technology.

It has proven particularly advantageous to operate by the two-component process and to combine the compounds (b) reactive toward isocyanate, the catalysts (d) if used, and/or auxiliaries and/or additives (e) in component (A) and preferably to mix these intimately with one another, and to use the isocyanates (a) as component (B).

The preferred components (c) may be introduced into the reaction mixture comprising (a), (b) and, if used, (d) and/or (e), and/or into the individual components described above (a) and (b), or into (A) and/or (B). The component with which (c) is mixed is usually liquid. It is preferable for the components to be mixed into component (b).

The mixing of the appropriate component with (c) may take place by well known processes. For example, (c) may be introduced into the appropriate component by way of well known feeding equipment, such as air-feeding equipment, preferably under pressure, for example from a pressure vessel or compressed by a compressor, e.g. by way of a nozzle. There is preferably substantial and thorough mixing of the corresponding components with (c), and the size of the bubbles of gaseous (c) in the usually liquid component is therefore preferably from 0.0001 to 10 mm, particularly preferably from 0.0001 to 1 mm.

The content of (c) in the reaction mixture for producing (ii) may be determined by way of the density of the reaction mixture using well known measurement devices in the return line of the high-pressure machinery. The content of (c) in the reaction mixture may preferably be regulated automatically on the basis of this density, by way of a control unit. Even at very low circulation rates, the component density can be determined on-line and regulated during conventional circulation of the material within the machinery.

The sandwich element may, for example, be produced by sealing off, except for a feed and a discharge for the starting components, the space to be filled between (i) and (iii) with the starting components for producing (ii), and charging the starting components (a), (b), (c) and, if desired, (d) and/or (e), preferably mixed, into the space between (i) and (iii), via the feed, preferably using conventional high-pressure machinery.

The starting components are usually mixed at from 0 to 100° C., preferably from 20 to 60° C., and, as already described, introduced into the space between (i) and (iii). They may be mixed mechanically using a stirrer or a mixing screw, but preferably by the countercurrent method usual in high-pressure machinery, in which a jet of A component and a jet of B component, each at high pressure, encounter one another in the mixing head and mix. The jet of one or other component may also have been divided. The reaction temperature, i.e. the temperature at which the reaction takes place, is usually >20° C., preferably from 50 to 150° C.

The polyisocyanate polyaddition products (ii) of the composite element produced according to the invention preferably have a modulus of elasticity of >275 MPa in the range from −45 to +50° C. (in accordance with DIN 53457), adhesion to (i) and (iii) of >4 MPa (in accordance with DIN 53530), elongation of >30% in the range from −45 to +50° C. (in accordance with DIN 53504), tensile strength of >20 MPa (in accordance with DIN 53504) and compressive strength of >20 MPa (in accordance with DIN 53421).

The novel composite elements which can be produced by the novel process have the following advantages over known designs:

The opening according to the invention markedly improves the performance of the composite element at high pressure differences and/or at high temperatures.

Shrinkage of (ii) and the associated impairment of adhesion of (ii) to (i) and (iii) can be avoided by the preferred use of (c).

Struts and similar reinforcing elements are almost completely superfluous. This gives a considerable cost reduction in manufacturing, via material saving and via significantly simpler corrosion protection.

In shipbuilding applications the lower weight gives higher tonnage and/or lower fuel consumption.

Maintenance, for example in relation to corrosion protection, is significantly simplified. This gives longer maintenance intervals.

The sandwich structure with the polyisocyanate polyaddition product, for example with the polyurethane elastomer, gives better energy absorption and therefore lower crack propagation. Known steel structures are susceptible to crack formation following perforation, when a further stress is applied, i.e. the leak expands to a large area of the hull. This minimizes the risk of damage in the event of an accident or under exceptional loads. This improved standard of safety is particularly advantageous for tankers.

Shrinkage can be reduced and the adhesion of (ii) to (i) and (iii) markedly improved by the use of (c) according to the invention in producing (ii).

The preferred polyisocyanate polyaddition products based on polyether polyalcohols are more resistant to hydrolytic degradation than products based on polyester polyalcohols. This gives considerable advantages, especially for use of the composite elements in shipbuilding.

The preferred reaction mixture comprising the polyether polyalcohols for producing (ii) has a markedly lower viscosity than reaction mixtures based on polyester polyalcohols. This enables more rapid and simpler manufacture of the composite elements.

The preferred content of fillers in the preferred polyisocyanate polyaddition products reduces the coefficient of thermal expansion of (ii), and thus brings it closer to the coefficients of (i) and (iii). Stresses between (i), (ii) and (iii) arising from thermal stresses, in particular caused by the ambient temperature, for example in the case of ships' hulls caused by variations in water temperatures, could be reduced according to the invention. This gave a lasting improvement in the adhesion of (ii) to (i) and (iii).

The adhesion of (ii) to (i) and (iii) could be markedly improved by the preferred sand-blasting of the surfaces of (i) and (iii). Due to the improved adhesion, the structural components obtained could have better stability and durability.

The composite elements obtainable according to the invention are therefore applied mainly where there is a need for structural elements which withstand large forces, for example as structural elements in shipbuilding, e.g. in hulls, for example double hulls with an outer and an inner wall, and cargo hold covers, or in building works, for example bridges, or as structural components in the construction of buildings, in particular for multistorey buildings.

The composite elements according to the invention should not be confused with traditional sandwich elements which comprise a rigid polyurethane foam and/or a rigid polyisocyanurate foam as core and are usually used for thermal insulation. The comparatively low mechanical load-bearing capacity of these known sandwich elements would make them unsuitable for the application sectors mentioned.

We claim:

1. A composite element which has the following layer structure:
    (i) a thickness of from 2 to 20 mm of metal,
    (ii) a thickness of from 10 to 300 mm of plastic, and
    (iii) a thickness of from 2 to 20 mm of metal,
    where (i) and/or (iii) have an opening and wherein the opening has been closed and opens when the pressure difference between (ii) and the other, outward-facing side of (i) and/or (iii) is at least 10 bar, where the higher pressure is present in (ii) and the higher pressure results from an increase in temperature in (ii) and wherein the opening has been connected to one end of a pipe which extends into (ii) and whose other end is at a distance of 0.5 to 9.5 mm from the surface in contact with (ii) of the metal layer which does not have the opening connected to the pipe.

2. A composite element as claimed in claim 1, wherein the opening has a diameter of from 0.5 to 100 mm.

3. A composite element as claimed in claim 1, whose opening has been closed and opens when the temperature is above 250° C.

4. A composite element as claimed in claim 1, wherein the opening is a valve.

5. A composite element as claimed in claim 4, wherein the valve has been connected by a method using screw threads to (i) and/or (iii).

6. A ship or a bridge comprising at least one composite element as in any of claims 1, 2 or 4–5.

7. A composite element as claimed in claim 1, wherein the plastic of (ii) degrades to cause the higher pressure present in (ii).

8. A composite element as claimed in claim 7, wherein (ii) is completely surrounded by (i) and (iii).

9. A composite element as claimed in claim 1, wherein the opening has been closed with a filling material, seal, or element.

10. A composite element as claimed in claim 9, wherein the filling material reversibly seals the opening and is selected from the group of metals with a melting point below 450° C., organic compounds with a melting point below 250° C., and plastics with a melting point below 250° C.

11. A composite element as claimed in claim 9, wherein the filling material is introduced into the opening in solid form to close the opening.

12. A composite element as claimed in claim 9, wherein the filling material is introduced into the opening in softened or molten form to close the opening.

13. A composite element which has the following layer structure:
    (i) a thickness of from 2 to 20 mm of metal,
    (ii) a thickness of from 10 to 300 mm of plastic, and
    (iii) a thickness of from 2 to 20 mm of metal,
    and a valve that opens in response to a pressure difference between (ii) and the other outward-facing side of (i) and/or (iii), where the higher pressure is present in (ii) and the higher pressure results from an increase in temperature in (ii), wherein the valve has been connected to one end of a pipe which extends into (ii) and whose other end is at a distance of 0.5 to 9.5 mm from the surface in contact with (ii) of the metal layer which does not have the valve connected to the pipe.

14. A composite element as claimed in claim 13, whose valve has been closed and opens when the temperature is above 250° C.

15. A composite element as claimed in claim 13, wherein the plastic of (ii) degrades to cause the higher pressure present in (ii).

16. A composite element as claimed in claim 15, wherein (ii) is completely surrounded by (i) and (iii).

17. A composite element which has the following layer structure:
    (i) a thickness of from 2 to 20 mm of metal,
    (ii) a thickness of from 10 to 300 mm of plastic, and
    (iii) a thickness of from 2 to 20 mm of metal,
    and a valve that opens in response to a higher pressure present in (ii) resulting from an increase in temperature in (ii) to dissipates gases from (ii), wherein the valve has been connected to one end of a pipe which extends into (ii) and whose other end is at a distance of 0.5 to 9.5 mm from the surface in contact with (ii) of the metal layer which does not have the valve connected to the pipe.

18. A composite element as claimed in claim 17, whose valve has been closed and opens when the temperature is above 250° C.

19. A composite element as claimed in claim 17, wherein the plastic of (ii) degrades to cause the higher pressure present in (ii).

20. A composite element as claimed in claim 19, wherein (ii) is completely surrounded by (i) and (iii).

21. A composite element which has the following layer structure:
    (i) a thickness of from 2 to 20 mm of metal,
    (ii) a thickness of from 10 to 300 mm of plastic, and
    (iii) a thickness of from 2 to 20 mm of metal,
    where (i) and/or (iii) have an opening and wherein the opening has been closed and opens when the pressure difference between (ii) and the other, outward-facing side of (i) and/or (iii) is at least 10 bar, where the higher pressure is present in (ii) and the higher pressure results from a condition present in (ii), wherein the opening has been connected to one end of a pipe which extends into (ii) and whose other end is at a distance of 0.5 to 9.5 mm from the surface in contact with (ii) of the metal layer which does not have the opening connected to the pipe.

22. A composite element as claimed in claim 21, wherein the condition present in (ii) is an increase in temperature in (ii).

23. A composite element as claimed in claim 22, whose opening has been closed and opens when the temperature is above 250° C.

24. A composite element as claimed in claim 21, wherein the opening has been closed with a filling material, seal, or element.

25. A composite element as claimed in claim 24, wherein the filling material reversibly seals the opening and is selected from the group of metals with a melting point below 450° C., organic compounds with a melting point below 250° C., and plastics with a melting point below 250° C.

26. A composite element as claimed in claim 21, wherein the plastic of (ii) degrades to cause the higher pressure present in (ii).

27. A composite element as claimed in claim 26, wherein (ii) is completely surrounded by (i) and (iii).

* * * * *